United States Patent
Stanwood et al.

(10) Patent No.: US 6,693,887 B2
(45) Date of Patent: Feb. 17, 2004

(54) METHOD FOR ALLOCATING FRACTIONAL BANDWIDTH IN A FIXED-FRAME COMMUNICATION SYSTEM

(75) Inventors: Kenneth L. Stanwood, Cardiff by the Sea, CA (US); Yair Bourlas, San Diego, CA (US)

(73) Assignee: Ensemble Communications, Inc., San Diego, CA (US)

( * ) Notice: Subject to any disclaimer, the term of this patent is extended or adjusted under 35 U.S.C. 154(b) by 0 days.

(21) Appl. No.: 09/788,283

(22) Filed: Feb. 15, 2001

(65) Prior Publication Data

US 2002/0110083 A1 Aug. 15, 2002

(51) Int. Cl.[7] .............................. H04Q 7/24; H04J 3/16; H04L 12/28
(52) U.S. Cl. ................ 370/338; 370/395.1; 370/395.43; 370/468
(58) Field of Search ................................. 370/229, 235, 370/280, 468, 236.2, 230.1, 470, 472, 476, 412, 418, 349, 337, 347, 395.1, 395.43, 395.61, 310.2, 395.21, 328, 338; 455/450, 452

(56) References Cited

U.S. PATENT DOCUMENTS

| | | |
|---|---|---|
| 3,949,404 A | 4/1976 | Fletcher et al. |
| 4,495,619 A | 1/1985 | Acampora |
| 5,297,144 A | 3/1994 | Gilbert et al. |
| 5,420,851 A | 5/1995 | Seshadri et al. |
| 5,444,698 A | 8/1995 | Kito |
| 5,511,082 A | 4/1996 | How et al. |
| 5,615,212 A | 3/1997 | Ruszczyk et al. |
| 5,638,371 A | 6/1997 | Raychaudhuri et al. |
| 5,638,374 A | 6/1997 | Heath |
| 5,675,573 A | 10/1997 | Karol et al. |
| 5,742,610 A * | 4/1998 | Natarajan .................... 370/472 |
| 5,751,708 A | 5/1998 | Eng et al. |
| 5,768,254 A | 6/1998 | Papadopoulos et al. |
| 5,828,695 A | 10/1998 | Webb |
| 5,859,619 A | 1/1999 | Wu et al. |
| 5,890,055 A | 3/1999 | Chu et al. |
| 5,978,374 A * | 11/1999 | Ghaibeh et al. ............. 370/395 |
| 5,978,375 A * | 11/1999 | Peterson et al. ............ 370/395 |
| 5,987,031 A * | 11/1999 | Miller et al. ................. 370/412 |
| 5,999,518 A * | 12/1999 | Nattkemper et al. ........ 370/258 |
| 6,006,069 A | 12/1999 | Langston |
| 6,016,311 A * | 1/2000 | Gilbert et al. ............... 370/280 |
| 6,016,313 A | 1/2000 | Foster, Jr. et al. |
| 6,038,455 A | 3/2000 | Gardner et al. |
| 6,094,421 A | 7/2000 | Scott |
| 6,112,080 A | 8/2000 | Anderson et al. |

OTHER PUBLICATIONS

Lin., et al., "Error Control Coding, Fundamentals and Applications", Prentice–Hall Computer Applications in Electrical Engineering Series., 1993, pp. 315–349.

L.H. Charles Lee, "Convolutional Coding, Fundamentals and Applications", Artech House, Inc., 1997, p. 11–51.

Redl, et al., "An Introduction to GSM", Artech House, Inc., 1995; pp. 84, 85 and 95.

C.E. Shannon, "A Mathematical Theory of Communication", Bell System Technical Journal, pp. 379–423 (Part 1), 623–656 (Part II), Jul. 1948.

(List continued on next page.)

*Primary Examiner*—Duc Ho
(74) *Attorney, Agent, or Firm*—Knobbe, Martens, Olson & Bear, LLP (57) ABSTRACT

A method for allocating fractional bandwidth in a fixed-frame communication system is described. The method includes calculating the integral cells per frame required at a connection, calculating the fractional cells per second required at the connection, setting a counter, adding the fractional cells per second to the counter, determining if the counter is above a preset limit, allocating an additional cell when the counter exceeds the preset limit, and reducing the counter a predetermined amount to reflect allocating the cell.

25 Claims, 7 Drawing Sheets

OTHER PUBLICATIONS

Ulm., et al., "Data–Over–Cable Interface Specifications, Radio Frequency Interface Specification", Hewlett Packard Interim Specification, Doc. Control No.: SP–RFII01–970321, published Mar. 21, 1997 by MCNS Holdings, L.P., Section 6, pp. 43–85.

Wolf, et al., "On the Weight Distribution of Linear Block Codes Formed From Convolutional Codes", IEEE, IEEE Transactions on Communications, vol. 44:9, Sep. 1996.

"Asynchronous Transfer Mode (ATM) Technical Overview", $2^{nd}$ Edition, Prentice Hall, Oct. 1995, Chapter 3, pp. 21–25.

* cited by examiner

METHOD FOR ALLOCATING FRACTIONAL BANDWIDTH IN A FIXED-FRAME COMMUNICATION SYSTEM

BACKGROUND OF THE INVENTION

1. Field of the Invention

This invention relates generally to packet data communication systems, and to a system and method for allocating fractional bandwidth in a fixed-frame communication system.

2. Background

Several systems are currently in place for connecting computer users to one another and to the Internet. For example, many companies such as Cisco Systems, provide data routers that route data from personal computers and computer networks to the Internet along conventional twisted pair wires and fiber optic lines. These same systems are also used to connect separate offices together in a wide area data network. However, these systems suffer significant disadvantages because of the time and expense required to lay high capacity communications cables between each office. This process is time consuming and expensive.

Many types of current wireless communication systems facilitate two-way communication between a plurality of subscriber radio stations or subscriber units (either fixed or portable) and a fixed network infrastructure. Exemplary communication systems include mobile cellular telephone systems, personal communication systems (PCS), and cordless telephones. The key objective of these wireless communication systems is to provide communication channels on demand between the plurality of subscriber units and their respective base stations in order to connect a subscriber unit user with the fixed network infrastructure (usually a wire-line system). In the wireless systems having multiple access schemes, a time "frame" is used as the basic information transmission unit. Each frame is sub-divided into a plurality of time slots. Some time slots are used for control purposes and some for information transfer. Subscriber units typically communicate with a selected base station using a "duplexing" scheme thus allowing for the exchange of information in both directions of connection.

Transmissions from the base station to the subscriber unit are commonly referred to as "downlink" transmissions. Transmissions from the subscriber unit to the base station are commonly referred to as "uplink" transmissions. Depending upon the design criteria of a given system, wireless communication systems have typically used either time division duplexing (TDD) or frequency division duplexing (FDD) methods to facilitate the exchange of information between the base station and the subscriber units. Both the TDD and FDD duplexing schemes are well known in the art.

Recently, wideband or "broadband" wireless communications networks have been proposed for the delivery of enhanced broadband services such as voice, data and video. The broadband wireless communication system facilitates two-way communication between a plurality of base stations and a plurality of fixed subscriber stations or Customer Premises Equipment (CPE).

Data communication systems often transfer data between the base station and the subscriber using fixed length data packets. One example of a fixed length data packet format is the Asynchronous Transfer Mode (ATM) data transfer protocol. ATM is described in "High Performance Communication Networks" by Jean Walrand and Pravin Varaiya, second edition© 2000 by Morgan Kaufmann Publishers, ISBN 1-55860-574-6, particularly in Chapter 6. ATM can satisfy a wide range of data communications needs, including highly variable data rates like Internet traffic, as well as time-sensitive traffic for voice or video connections. ATM provides flexibility by providing relatively small, fixed-length cells as the packets in which data is communicated.

ATM cells have a cell length of 53 bytes. 5 bytes of each cell are allocated to a header to be used for header information. Therefore, each ATM cell contains a payload section of 48 bytes.

SUMMARY OF THE INVENTION

The systems and methods of the present invention have several features, no single one of which is solely responsible for its desirable attributes. Without limiting the scope of this invention as expressed by the claims which follow, its more prominent features will now be discussed briefly. After considering this discussion, and particularly after reading the section entitled "Detailed Description of the Invention" one will understand how the features of this invention provide several advantages over traditional allocation systems.

An aspect of the invention relates to a method and system for allocating bandwidth to constant bit rate connections with uplink needs known at the base station in a fixed-frame communication system, including calculating the integral cells per frame required at a connection, calculating the fractional cells per second required at the connection, setting a counter, adding the fractional cells per second to the counter, determining if the counter is above a preset limit, allocating an additional cell when the counter exceeds the preset limit, and reducing the counter a predetermined amount to reflect allocating the cell.

A further aspect of the invention relates to a wireless communication system including at least one base station and a plurality of subscriber stations. Each subscriber station has at least one subscriber with a connection between the subscriber and the subscriber station, wherein the subscriber station includes a controller with an allocation module. The allocation module includes a setup sub-module that calculates the fractional cells per second transmitted between the subscriber premises and the subscriber station, and a transmit sub-module that tracks the number of fractional cells per second and allocates a cell when the number of fractional cells per second reaches a predetermined level.

BRIEF DESCRIPTION OF THE DRAWINGS

These and other objects and features of the present invention will become more fully apparent from the following description and appended claims taken in conjunction with the following drawings.

DETAILED DESCRIPTION OF THE PREFERRED EMBODIMENT

The following presents a detailed description of certain specific embodiments of the invention. However, the invention can be embodied in a multitude of different ways as defined and covered by the claims. In this description, reference is made to the drawings wherein like parts are designated with like numerals throughout.

Figure 1:
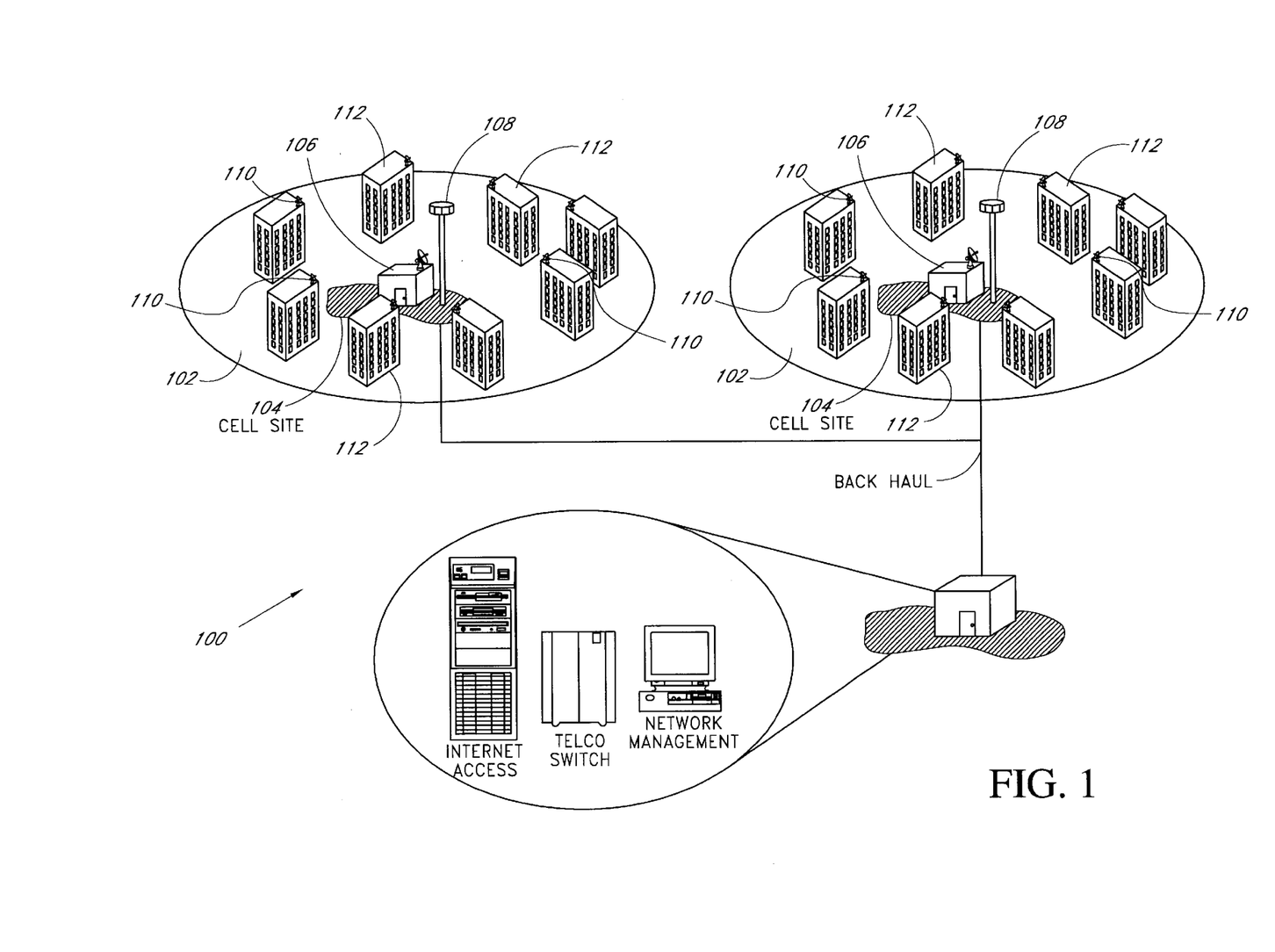
FIG. 1 is a simplified block diagram of a broadband wireless communication system.

One exemplary broadband wireless communication system is described in U.S. Pat. No. 6,016,311, issued Jan. 18, 2000 to Gilbert, et al., which is hereby incorporated by reference, and is shown in the block diagram of FIG. 1. As shown in FIG. 1, the exemplary broadband wireless communication system 100 includes a plurality of cells 102. Each cell 102 contains an associated cell site 104 that primarily includes a base station 106 and an active antenna array 108. Each cell 102 provides wireless connectivity between the cell's base station 106 and a plurality of customer premises equipment (CPE) 110 positioned at fixed customer sites 112 throughout the coverage area of the cell 102. The users of the system 100 may include both residential and business customers. Consequently, the users of the system have different and varying usage and bandwidth requirement needs. Each cell may service several hundred or more residential and business CPEs.

The broadband wireless communication system 100 of FIG. 1 provides true "bandwidth-on-demand" to the plurality of CPEs 110. CPEs 110 request bandwidth allocations from their respective base stations 106 based upon the type and quality of services requested by the customers served by the CPEs. Different broadband services have different bandwidth and latency requirements. The type and quality of services available to the customers are variable and selectable. The amount of bandwidth dedicated to a given service is determined by the information rate and the quality of service required by that service (and also taking into account bandwidth availability and other system parameters). For example, T1-type continuous data services typically require a great deal of bandwidth having well controlled delivery latency. Until terminated, these services require constant bandwidth allocation for each frame. In contrast, certain types of data services such as Internet protocol data services (TCP/IP) are bursty, often idle (which at any one instant may require zero bandwidth), and are relatively insensitive to delay variations when active. The base station media access control ("MAC") allocates available bandwidth on a physical channel on the uplink and the downlink. Within the uplink and downlink sub-frames, the base station MAC allocates the available bandwidth between the various services depending upon the priorities and rules imposed by their quality of service ("QoS"). The MAC transports data between a MAC "layer" (information higher layers such as TCP/IP) and a "physical layer" (information on the physical channel).

Due to the wide variety of CPE service requirements, and due to the large number of CPEs serviced by any one base station, the bandwidth allocation process in a broadband wireless communication system such as that shown in FIG. 1 can become burdensome and complex. This is especially true with regard to rapidly transporting data while maintaining synchronization between the MAC and physical communication protocol layers. Base stations transport many different data types (e.g., T1 and TCP/IP) between the MAC and physical layers through the use of data protocols. One objective of a communication protocol is to efficiently transport data between the MAC and physical layers. A communication protocol must balance the need for transmitting data at maximum bandwidth at any given time against the need for maintaining synchronization between the MAC and physical layers when the data is lost during transportation.

An important performance criterion of a broadband wireless communication system, and any communication system for that matter having a physical communication medium shared by a plurality of users, is how efficiently the system uses the physical medium. Because wireless communication systems are shared-medium communication networks, access and transmission by subscribers to the network must be controlled. In wireless communication systems a Media Access Control ("MAC") communication protocol typically controls user accesses to the physical medium. The MAC determines when subscribers are allowed to transmit on the physical medium. In addition, if contentions are permitted, the MAC controls the contention process and resolves any collisions that occur.

In the system shown in FIG. 1, the MAC is typically executed by software processed by the base stations 106. In other embodiments, the software may execute on processors both in the base stations and the CPE. The base stations 106 receive requests for transmission rights and grant these requests within the time available taking into account the priorities, service types, quality of service and other factors associated with the CPEs 110. The services provided by the CPEs 110 vary and can include continuous bit rate data service such as T1 connections requiring a great deal of bandwidth having well-controlled delivery latency. At the other end of the service spectrum, the CPEs may uplink bursty yet delay-tolerant computer data for communication with the well-known World Wide Web or Internet.

The base station MAC maps and allocates bandwidth for both the uplink and downlink communication links. These maps are developed and maintained by the base station and are referred to as the Uplink Sub-frame Maps and Downlink Sub-frame Maps. The MAC must allocate sufficient bandwidth to accommodate the bandwidth requirements imposed by high priority constant bit rate (CBR) services such as T1, E1 and similar constant bit rate services. In addition, the MAC must allocate the remaining system bandwidth across the lower priority services such as Internet Protocol (IP) data services. The MAC distributes bandwidth among these lower priority services using various "quality of service" dependent techniques such as fair-weighted queuing and round-robin queuing.

The downlink of the communication system shown in FIG. 1 operates on a point-to-multi-point basis (i.e., from the base station 106 to the plurality of CPEs 110). As described in related U.S. Pat. No. 6,016,311, the central base station 106 includes a sectored active antenna array 108 which is capable of simultaneously transmitting to several sectors. In one embodiment of the system 100, the active antenna array 108 transmits to six independent sectors simultaneously. Within a given frequency channel and antenna sector, all CPEs receive the same transmission. The base station is the only transmitter operating in the downlink direction, hence it transmits without having to coordinate with other base stations, except for the overall time-division duplexing that divides time into upstream (uplink) and downstream (downlink) transmission periods. The base station broadcasts to all of the CPEs in a sector (and frequency). The CPEs monitor the addresses in the received messages and retain only those addressed to them.

The CPEs 110 share the uplink on a demand basis that is controlled by the base station MAC. Depending upon the class of service utilized by a CPE, the base station may issue a selected CPE continuing rights to transmit on the uplink, or the right to transmit may be granted by a base station after receipt of a request from the CPE. In addition to individually addressed messages, the base station may also send messages to multicast groups (control messages and video distribution are examples of multicast applications) as well as broadcast to all CPEs.

In one preferred embodiment of the present invention, the base stations 106 maintain sub-frame maps of the bandwidth allocated to the uplink and downlink communication links. The uplink and downlink are preferably multiplexed in a time-division duplex (or "TDD") manner. Although the present invention is described with reference to its application in a TDD system, the invention is not so limited. Those skilled in the communications art shall recognize that the present inventive method and apparatus can readily be adapted for use in an FDD system.

In one embodiment adapted for use in a TDD system, a frame is defined as comprising N consecutive time periods or time slots (where N remains constant). In accordance with this "frame-based" approach, the communication system dynamically configures the first $N_1$ time slots (where N is greater than or equal to $N_1$) for downlink transmissions only. The remaining $N_2$ time slots are dynamically configured for uplink transmissions only (where $N_2$ equals $N-N_1$). Under this TDD frame-based scheme, the downlink sub-frame is preferably transmitted first and is prefixed with information that is necessary for frame synchronization.

Figure 2:
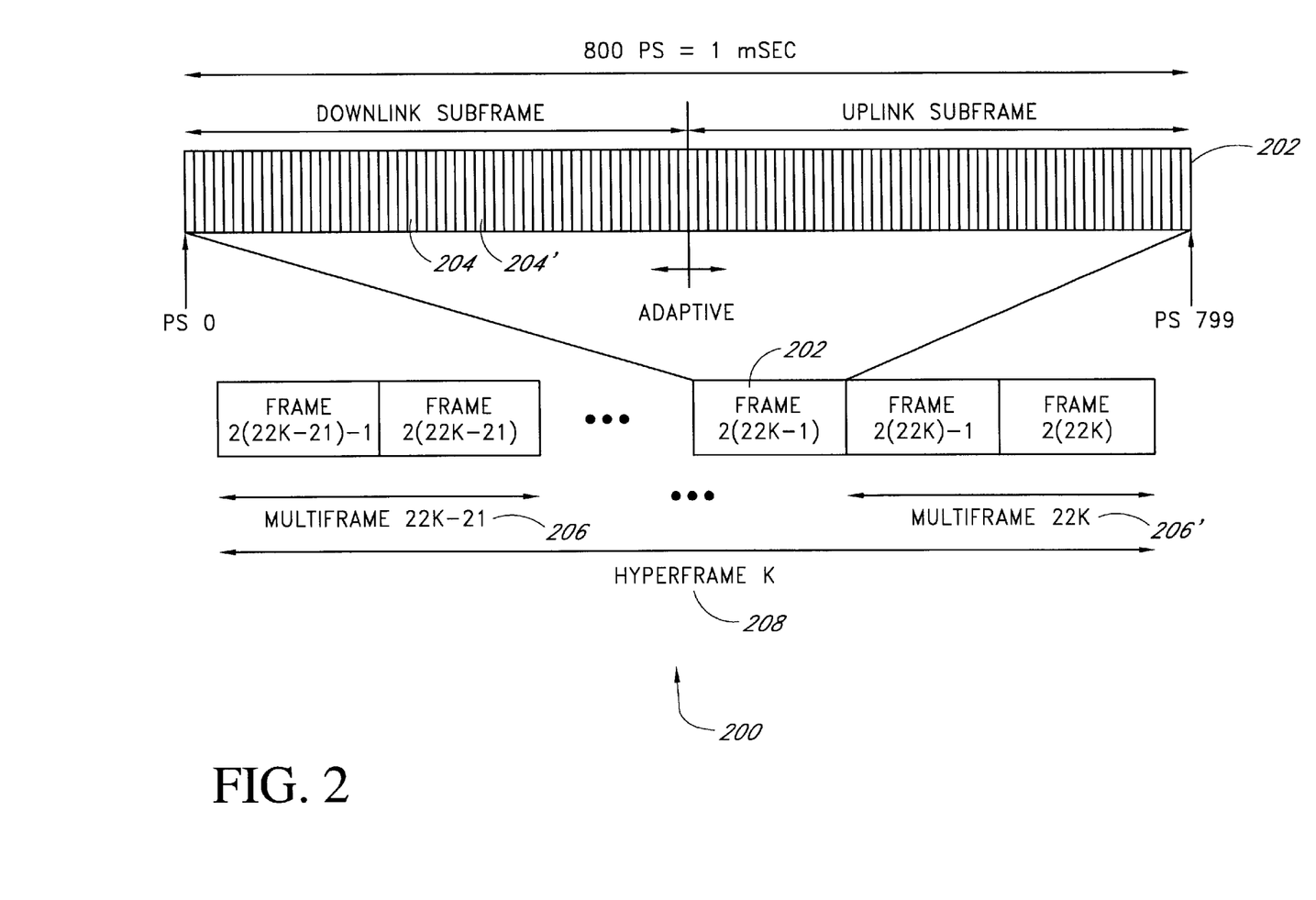
FIG. 2 is a TDD frame and multi-frame structure that can be used by the communication system of FIG. 1.

FIG. 2 shows a TDD frame and multi-frame structure 200 that can be used by a communication system (such as that shown in FIG. 1). As shown in FIG. 2, the TDD frame 200 is subdivided into a plurality of physical slots (PS) 204, 204'. In the embodiment shown in FIG. 2, the frame is one millisecond in duration and includes 800 physical slots. Alternatively, the present invention can be used with frames having longer or shorter duration and with more or fewer PSs. The available bandwidth is allocated by a base station in units of a certain pre-defined number of PSs. Some form of digital encoding, such as the well-known Reed-Solomon encoding method, is performed on the digital information over a pre-defined number of bit units referred to as information elements (PI). The modulation may vary within the frame and determines the number of PS (and therefore the amount of time) required to transmit a selected PI.

As described in more detail in related U.S. Pat. No. 6,016,311, in one embodiment of the broadband wireless communication system shown in FIG. 1, the TDD framing preferably is adaptive. That is, the number of PSs allocated to the downlink versus the uplink varies over time. The present inventive data transportation and synchronization method and apparatus can be used in both FDD and TDD communication systems. Further, the present invention can be used in both adaptive and fixed TDD systems using a frame and multi-frame structure similar to that shown in FIG. 2. As shown in FIG. 2, to aid periodic functions, multiple frames 202 are grouped into multi-frames 206, and multiple multi-frames 206 are grouped into hyper-frames 208. In one embodiment, each multi-frame 206 comprises two frames 202, and each hyper-frame comprises twenty-two multi-frames 206. Other frame, multi-frame and hyper-frame structures can be used with the present invention. For example, in another embodiment of the present invention, each multi-frame 206 comprises sixteen frames 202, and each hyper-frame comprises thirty-two multi-frames 206. Exemplary downlink and uplink sub-frames used in practicing the present invention are shown respectively in FIGS. 3 and 4.

Figure 3:
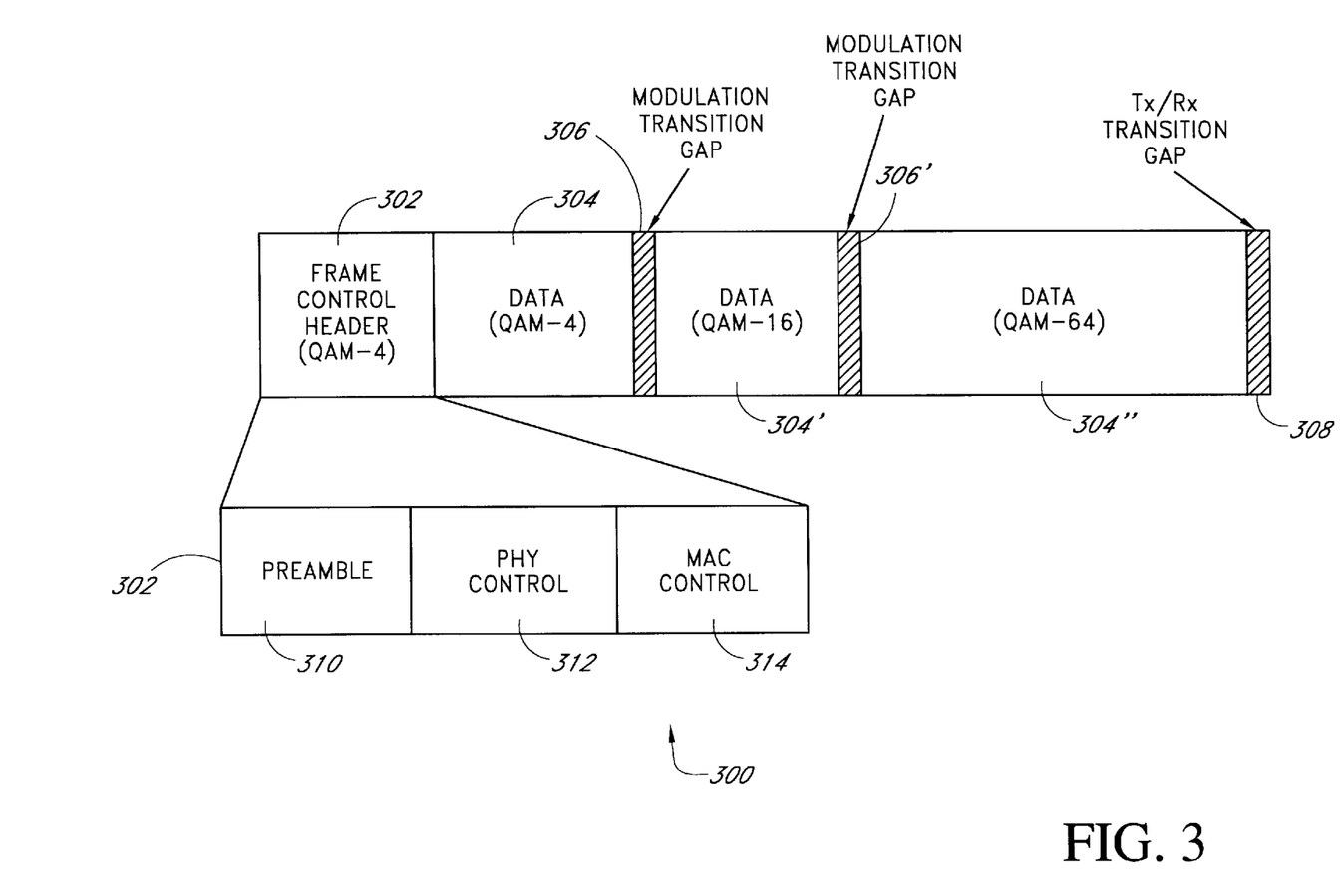
FIG. 3 shows an exemplary downlink sub-frame that can be used by the base stations to transmit information to the plurality of CPEs in the wireless communication of system of FIG. 1.

FIG. 3 shows one example of a downlink sub-frame 300 that can be used by the base stations 106 to transmit information to the plurality of CPEs 110. The base station preferably maintains a downlink sub-frame map that reflects the downlink bandwidth allocation. The downlink sub-frame 300 preferably comprises a frame control header 302, a plurality of downlink data PSs 304 grouped by modulation type (e.g., PS 304 data modulated using a QAM-4 modulation scheme, PS 304' data modulated using QAM-16, etc.) and possibly separated by associated modulation transition gaps (MTGs) 306 used to separate differently modulated data, and a transmit/receive transition gap 308. In any selected downlink sub-frame any one or more of the differently modulated data blocks may be absent. In one embodiment, modulation transition gaps (MTGs) 306 are 0 PS in duration. As shown in FIG. 3, the frame control header 302 contains a preamble 310 that is used by the physical protocol layer (or PHY) for synchronization and equalization purposes. The frame control header 302 also includes control sections for both the PHY (312) and the MAC (314).

The downlink data PSs are used for transmitting data and control messages to the CPEs 110. This data is preferably encoded (using a Reed-Solomon encoding scheme for example) and transmitted at the current operating modulation used by the selected CPE. Data is preferably transmitted in a pre-defined modulation sequence: such as QAM-4, followed by QAM-16, followed by QAM-64. The modulation transition gaps 306, if present, are used to separate the modulation schemes used to transmit data. The PHY Control portion 312 of the frame control header 302 preferably contains a broadcast message indicating the identity of the PS 304 at which the modulation scheme changes. Finally, as shown in FIG. 3, the Tx/Rx transition gap 308 separates the downlink sub-frame from the uplink sub-frame.

Figure 4:
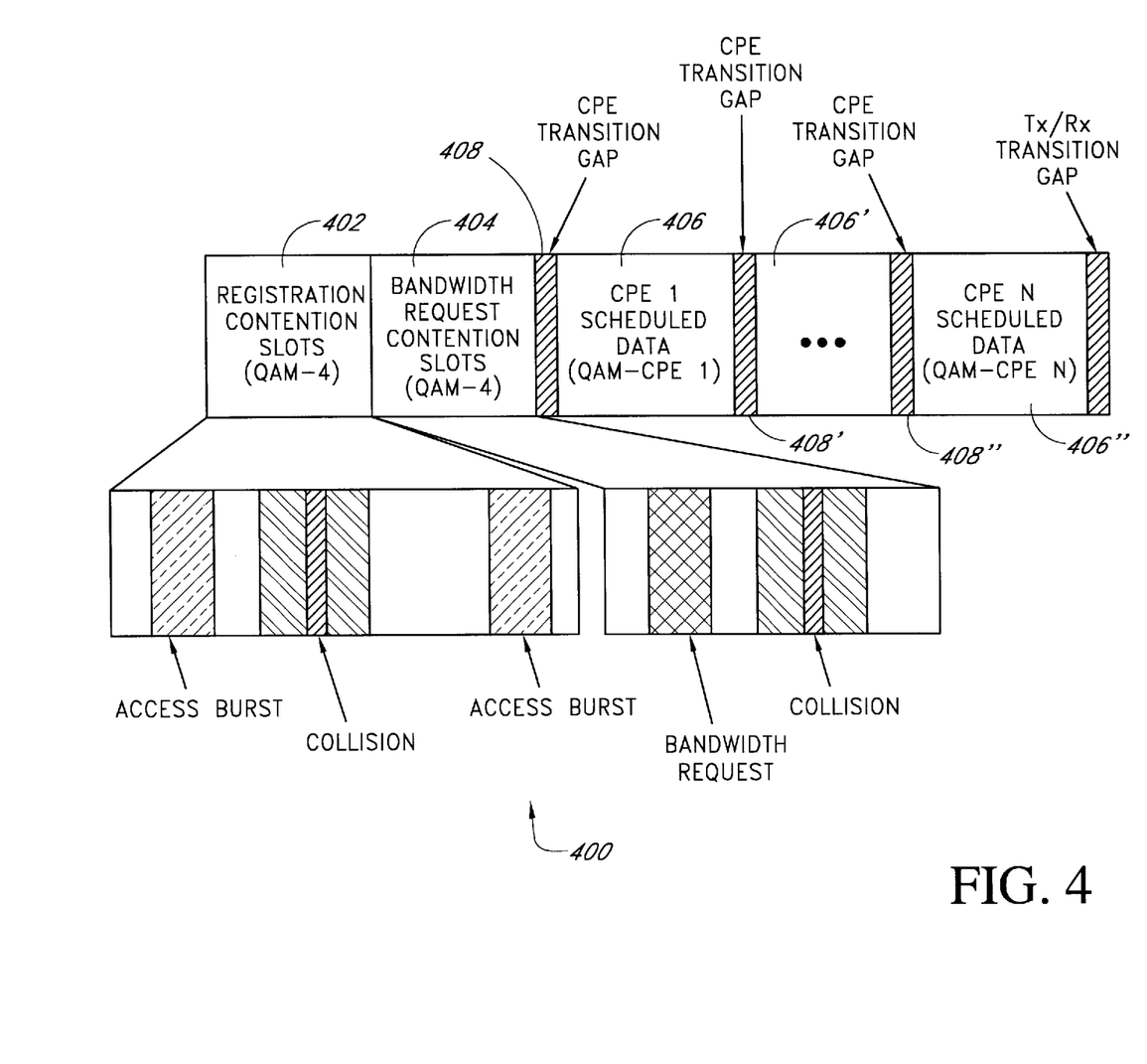
FIG. 4 shows an exemplary uplink sub-frame that is adapted for use with the wireless communication system of FIG. 1.

FIG. 4 shows one example of an uplink sub-frame 400 that is adapted for use with the present data transportation and synchronization invention. In accordance with the present data transportation and synchronization method and apparatus, the CPEs 110 (FIG. 1) use the uplink sub-frame 400 to transmit information (including bandwidth requests) to their associated base stations 106. As shown in FIG. 4, there are three main classes of MAC control messages that are transmitted by the CPEs 110 during the uplink frame: (1) those that are transmitted in contention slots reserved for CPE registration (Registration Contention Slots 402); (2) those that are transmitted in contention slots reserved for responses to multicast and broadcast polls for bandwidth allocation (Bandwidth Request Contention Slots 404); and those that are transmitted in bandwidth specifically allocated to individual CPEs (CPE Scheduled Data Slots 406).

The bandwidth allocated for contention slots (i.e., the contention slots 402 and 404) is grouped together and is transmitted using a pre-determined modulation scheme. For example, in the embodiment shown in FIG. 4 the contention slots 402 and 404 are transmitted using a QAM-4 modulation. The remaining bandwidth is grouped by CPE. During its scheduled bandwidth, a CPE 110 transmits with a fixed modulation that is determined by the effects of environmental factors on transmission between that CPE 110 and its associated base station 106. The uplink sub-frame 400 includes a plurality of CPE transition gaps (CTGs) 408 that serve a similar function to the modulation transition gaps (MTGs) 306 described above with reference to FIG. 3. That is, the CTGs 408 separate the transmissions from the various CPEs 110 during the uplink sub-frame 400. In one embodiment, the CTGs 408 are 2 physical slots in duration. A transmitting CPE preferably transmits a 1 PS preamble during the second PS of the CTG 408 thereby allowing the base station to synchronize to the new CPE 110. Multiple CPEs 110 may transmit in the registration contention period simultaneously resulting in collisions. When a collision occurs the base station may not respond. The downlink and uplink sub-frames provide a mechanism for layered data transportation in a wireless communication system.

Figure 5:
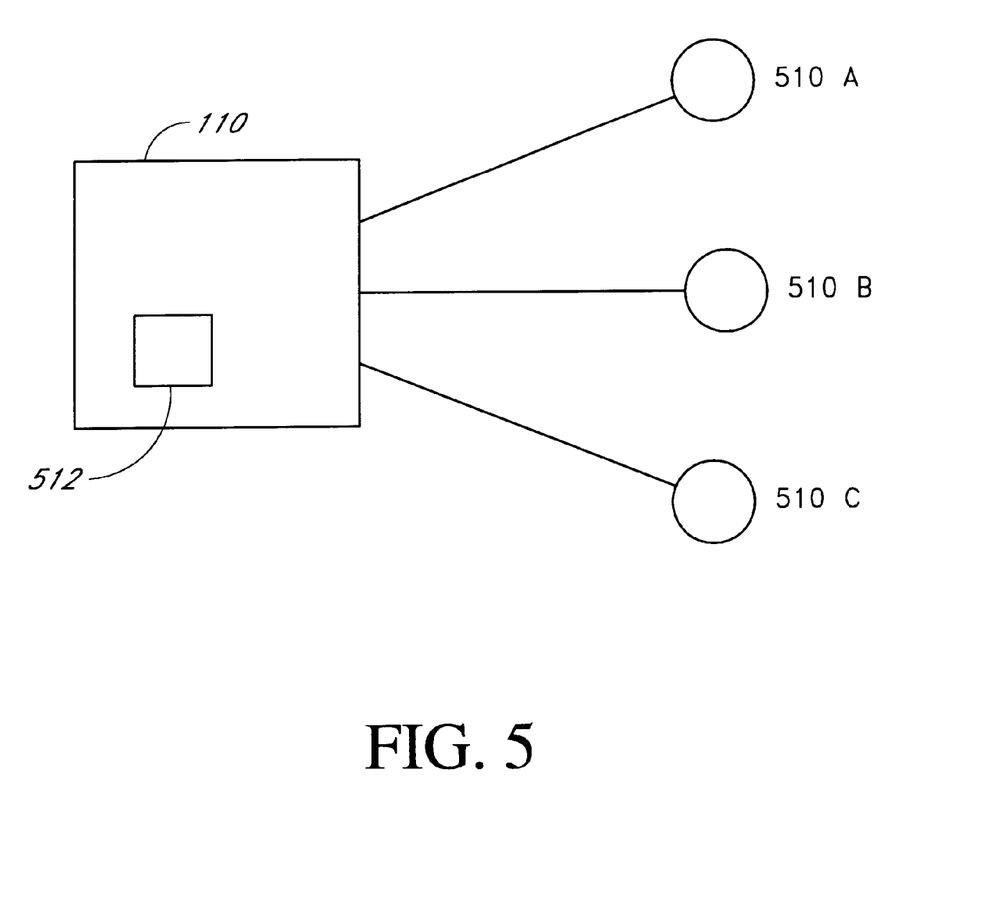
FIG. 5 is a functional block diagram of a CPE.

Referring now to FIG. 5, subscribers of the system connect to the CPE 110 using connections 510 that provide the bandwidth required by the individual customer. The CPE 110 includes a controller 512 that can include one or more modules for allocating bandwidth to the individual customers. FIG. 5 shows the controller 512 as part of the CPE 110, however, the functions of the controller 512 can be distributed or shared between the CPE 110 or the base station 106 of FIG. 1.

The term "module," as used in the Detailed Description, means, but is not limited to, a software or hardware component, which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. Additionally, the components and modules may advantageously be implemented to execute on one or more computers.

FIG. 5 shows connections 510A, 510B, 510C. Any number of connections 510 can connect to CPE 110. These subscribers may include both residential and business subscribers. Consequently, the subscribers of the system have different and varying usage and bandwidth requirements. Different types of constant bit rate (CBR) connections 510 may be used to connect the subscribers having varying bandwidth requirements. Some examples of CBR connections are T1, E1, fractional T1 and fractional E1 connections.

For example, T1 connections typically have a controlled delivery latency. Until terminated, these services require constant bandwidth allocation for each frame. For example, T1 connections are well behaved in that they generate 192 bytes every millisecond. This translates into 4 ATM cells per frame. In contrast, Fractional T1 connections are not as well behaved. For instance, a single DS0 of a channelized T1 connection having 24 DS0s, generates an ATM cell every 6 milliseconds if padding is not used to fill out the cells. Additionally, T1 control overhead can cause a T1 connection to generate approximately 4.2 cells per millisecond depending upon the choice of control mechanism. So, a basic problem is that CBR connections, expressed in cells per second, do not always have an integral number of cells per one millisecond frame.

During uplink to the CPE 110, some CBR connections 510 do not fill an entire ATM cell during each uplink transmission cycle to the CPE 110. It is advantageous to have systems and methods that utilize an allocation module to resolve uplink bandwidth allocation problems such as the one described above. It is advantageous to have an allocation module in which the fractional cells generated by a subscriber are allocated periodically as a whole cell, without the waste of bandwidth. It is also advantageous to have the whole cell portions of a connection's needed cells allocated every transmission cycle. Additionally, it is advantageous to allocate additional cells from multiple connections periodically so that they are distributed across the transmission cycles so they do not stack together in an artificial over-subscription of the link. Also, it is advantageous to have an allocation module that is efficient computationally.

First, we describe an example to explain a problem addressed by the systems and methods. Assume that the CPE 110 has enough uplink bandwidth with the base station 106 to allocate 10 ATM cells per frame. Assume that the CPE 110 has 20 CBR connections. Each of these connections is a fractional T1 connection containing a single DS0. The average bandwidth required for these connections is 3⅓ ATM cells per frame. It appears that CPE 110 has three times the required bandwidth available. But, since these 20 connections each require a cell every 6 frames, if their requirements are not distributed across multiple frames, there could be a single frame where 11 or more connections all require a cell during the same frame, thereby exceeding the capacity of the CPE 110. This creates an artificial instantaneous over-subscription of the link every 6 frames, even though there is ample bandwidth to meet the average needs of these connections 510.

Referring again to FIG. 5, we now describe exemplary systems and methods that address this issue. CPE 110 with three CBR connections 510 A–C is shown. The bandwidth needs of each CBR connection 510 A–C can be expressed in the peak rate of the connection in cells per second. This value is defined as $p_i$, where i is the connection ID. A simplification that can be made in this embodiment is to allocate uplink CBR bandwidth on a per CPE basis rather than on a per connection basis. Because CBR connections are guaranteed bandwidth, there will not be an over-subscription of CBR connections except in conjunction with a mechanism to disable low priority CBR connections when environmental conditions degrade to a state that would otherwise cause over-subscription.

For example, the three CBR connections 510 A–C require 1.4, 2.1, and 0.7 cells per frame, respectively. An allocation module of the CPE 110 can treat this as a single connection requiring 4.2 cells per frame. This allows the allocation module to perform allocation calculations, as will be described below, once for the CPE 110 rather than once for each CBR connection, or three times in this example. In this example, modifications to the allocation module would only need to be performed with the addition or deletion of CBR connections. Therefore the bandwidth needed for the set of CBR connections 510 A–C is the sum of each of the $p_i$ in the set and is defined as $p_{cpe}$.

Figure 6:
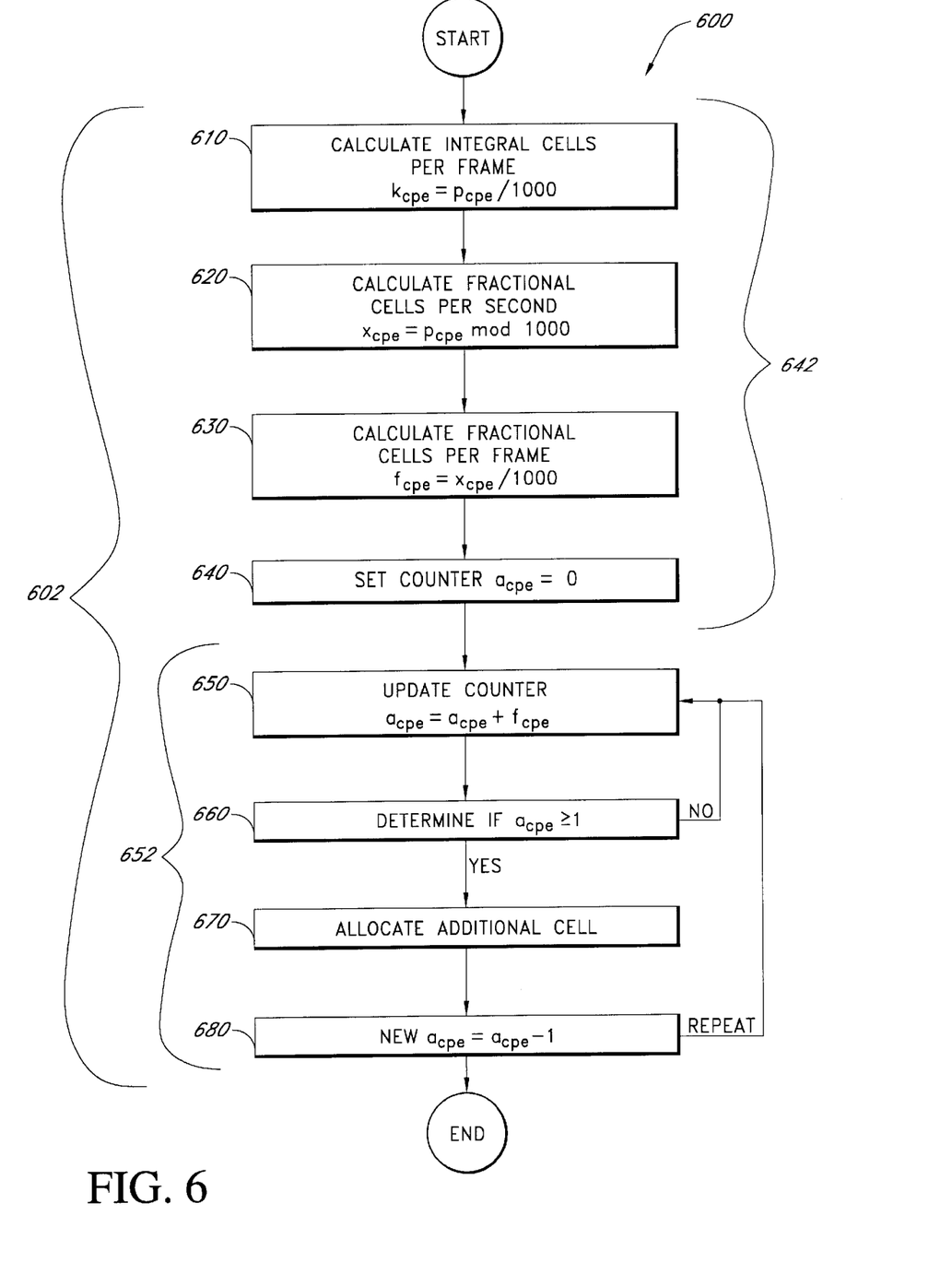
FIG. 6 is a block diagram of a method for allocating bandwidth according to the invention.

FIG. 6 illustrates a method 600 of allocating fractional bandwidth performed by an allocation module 602 on controller 512 (not shown). The method also allocates the integral cells per frame for the CPE 110 in a separate step from the allocation of the periodic cells. In step 610, a setup sub-module 642 of the allocation module 600 calculates the integer number of cells per frame ($k_{cpe}$) using integer arithmetic with truncation using equation (1).

$$k_{cpe} = p_{cpe}/1000 \qquad (1)$$

In step 620, the setup sub-module 642 of the allocation module calculates the fractional number of cells per second ($x_{cpe}$) using equation (2).

$$x_{cpe} = p_{cpe} \bmod 1000 \quad (2)$$

In step 630, the setup sub-module 642 of the allocation module calculates the fractional cells per frame ($f_{cpe}$) using equation (3).

$$f_{cpe} = x_{cpe}/1000 \quad (3)$$

The allocation module 602 next determines the accumulated fractional cells and allocates cells when there are sufficient fractional cells to be combined to fill a whole cell. For example, in step 640, initially a counter for counting accumulated fractional cells is set to zero. The count of the counter equals $a_{cpe}$. For each frame, the value of $a_{cpe}$ is updated, and cells are allocated utilizing the following process performed by a transmit sub-module 652 of the allocation module 602. Alternatively, software can be used to keep track of accumulated fractional cells without using a counter.

In step 650, the transmit sub-module 652 adds the fractional cells per frame $f_{cpe}$ to the count of the counter $a_{cpe}$. In step 660, the transmit sub-module 652 determines if the count $a_{cpe}$ is greater than or equal to 1. If the count $a_{cpe}$ is greater than or equal to 1, then an additional cell is allocated in step 670 by the allocation module 602. In step 680, the transmit sub-module 652 subtracts 1 from the count $a_{cpe}$ when an additional cell is allocated.

Figure 7:
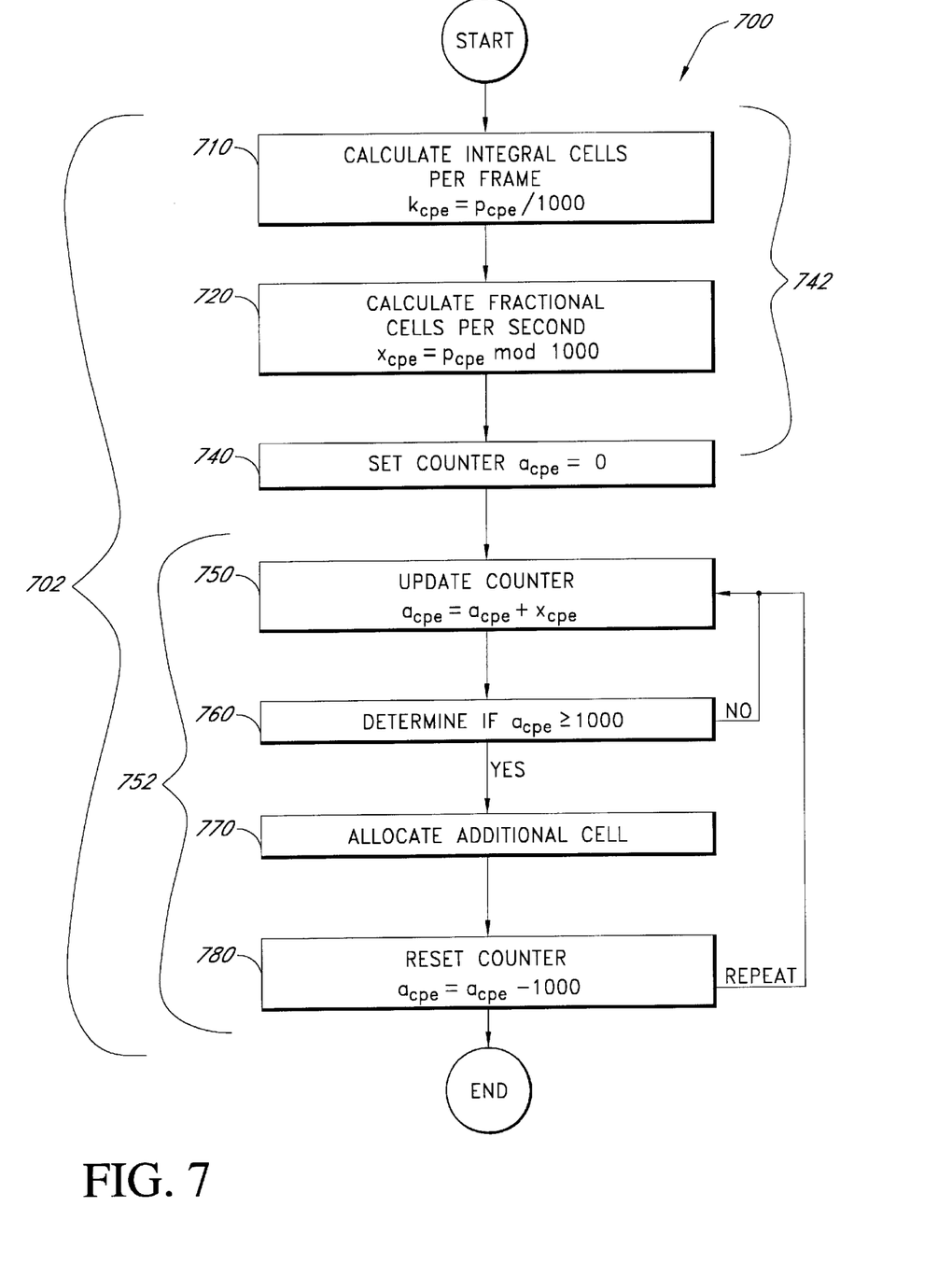
FIG. 7 is a block diagram of a method for allocating bandwidth according to the invention.

FIG. 7 is a flow chart of a second embodiment 700 in which an allocation module 702 uses a method 700 similar to the method 600 in which the complexity of the calculation can be streamlined by using scaled integer arithmetic with the 3 decimal digits of precision needed to handle a 1-millisecond frame (1000 frames per second). Steps 710, 720 and 740 performed by a setup sub-module 742 are the same as steps 610, 620 and 640 respectively from FIG. 6.

In step 750, a transmit sub-module 752 adds the fractional number of cells per second $x_{cpe}$ to the count of the counter $a_{cpe}$. In step 760, the transmit sub-module 752 determines if the count $a_{cpe}$ is greater than or equal to 1000. If the count $a_{cpe}$ is greater than or equal to 1000, then an additional cell is allocated in step 770 by the allocation module 702. In step 780, the transmit sub-module 752 subtracts 1000 from the count $a_{cpe}$ when an additional cell is allocated.

The second embodiment 700 is mathematically equivalent to the first embodiment 600, but requires an addition calculation rather than a divide calculation and does not require floating-point arithmetic which is computationally more expensive than integer arithmetic.

Specific methods and functions have been set forth. However, a skilled technologist will realize that there are many ways to perform the methods of the present invention, and that there are many parts, components or functions that may be substituted for those listed above.

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

What is claimed is:

1. A method for allocating bandwidth to constant bit rate connections in a fixed duration frame communication system, comprising:
    (a) calculating the integral cells per frame required by a constant bit rate connection;
    (b) calculating the fractional cells per frame required by the connection;
    (c) setting a counter;
    (d) adding the fractional cells per frame to the counter;
    (e) determining if the counter is above a preset limit;
    (f) allocating an additional cell when the counter exceeds the preset limit; and
    (g) reducing the counter a predetermined amount to reflect allocating the cell.

2. The method of claim 1, wherein the cells are ATM cells.

3. The method of claim 1, further comprising calculating the fractional cells per frame at the connection.

4. The method of claim 3, wherein each frame is 1 millisecond.

5. The method of claim 1, wherein the fractional cells per frame are added to the counter each frame.

6. The method of claim 1, further comprising repeating steps d–g until the bandwidth requirements of the connection change.

7. The method of claim 6, further comprising repeating steps a–c when said bandwidth requirements of said connection change.

8. The method of claim 1 wherein the connection comprises a plurality of individual constant bit rate connections and further comprising summing an average bandwidth requirement for the plurality of individual constant bit rate connections to determine a cumulative bit rate of the connection.

9. A method for allocating bandwidth in a wireless communication system comprising at least one base station and a plurality of subscriber stations, with each subscriber station having at least one subscriber with a connection between the subscriber's premises and the subscriber station, the method comprising:
    determining fractional cells per frame required by a subscriber for a constant bit rate connection;
    storing the fractional cells at the subscriber until the fractional cells accumulate sufficiently to fill a whole cell; and
    allocating a cell to the subscriber when the fractional cells at the subscriber have accumulated sufficiently such that data is transferred from the subscriber to the subscriber station as whole cells.

10. The method of claim 9, wherein allocating a cell includes setting a counter, adding the fractional cells per frame to the counter, determining if the counter is above a preset limit which indicates that at least one cell of fractional cells per frame have been added to the counter, and allocating an additional cell when the counter exceeds the preset limit.

11. The method of claim 9, wherein the cells are ATM cells.

12. The method of claim 9 wherein the step of determining fractional cells per frame required by the subscriber comprises the step of summing an average bandwidth requirement for a plurality of individual constant bit rate connections.

13. A wireless communication system comprising:
    at least one base station;
    a plurality of subscriber stations, each subscriber station having at least one subscriber with a connection between the subscriber and the subscriber station, wherein said subscriber station comprises a controller with an allocation module, said allocation module comprising:

a setup sub-module configured to determine fixed rate subscriber bandwidth requirements in terms of whole cells and fractional cells per defined period transmitted between the subscriber premises and the subscriber station; and a transmit sub-module configured to transmit data in whole cells, accumulate fractional cells and allocate a cell when the number of accumulated fractional cells reaches a predetermined level.

14. The system of claim 13, wherein the transmit sub-module comprises a counter that counts accumulated fractional cells per second.

15. The system of claim 13, wherein the transmit sub-module comprises a counter that counts accumulated fractional cells per frame.

16. The system of claim 15, wherein the frame is 1 millisecond.

17. The system of claim 13, wherein the cells are ATM cells.

18. The system of claim 13 wherein the setup sub-module is further configured to determine the fixed rate subscriber bandwidth requirement by summing an average bandwidth required for a plurality of individual constant bit rate connections.

19. A controller for use in a subscriber station in a wireless communication system comprising at least one base station and a plurality of subscriber stations, with each subscriber station having at least one subscriber with a connection between a subscriber and the subscriber station, the controller comprising:

a setup sub-module that calculates the fractional cells per frame transmitted from the subscriber to the subscriber station; and a transmit sub-module that tracks the number of fractional cells per frame and allocates a cell when the number of fractional cells per frame reaches a predetermined level.

20. The system of claim 19, wherein the cells are ATM cells.

21. The system of claim 16, wherein the transmit sub-module comprises a counter that counts accumulated fractional cells per second.

22. The system of claim 19, wherein the transmit sub-module comprises a counter that counts accumulated fractional cells per frame.

23. The system of claim 22, wherein the frame is 1 millisecond.

24. The system of claim 19 wherein the setup sub-module is further configured to calculate fractional cells per frame by summing an average bandwidth required for a plurality of individual constant bit rate connections.

25. A controller for use in a subscriber station in a wireless communication system comprising at least one base station and a plurality of subscriber stations, with each subscriber station having at least one subscriber with a connection between a subscriber and the subscriber station, wherein said controller comprises:

means for calculating the integral cells per frame required by a constant bit rate connection;

means for calculating the fractional cells per frame required by the constant bit rate connection;

means for determining the amount of fractional cells per frame accumulated;

means for determining if a predetermined amount of fractional cells per frame have been accumulated means for allocating an additional cell when said predetermined amount of fractional cells per frame have been accumulated; and means for reducing the amount of fractional cells per frame accumulated by an amount to reflect allocating the cell.

* * * * *

UNITED STATES PATENT AND TRADEMARK OFFICE
CERTIFICATE OF CORRECTION

| | | |
|---|---|---|
| PATENT NO. | : 6,693,887 B2 | Page 1 of 1 |
| APPLICATION NO. | : 09/788283 | |
| DATED | : February 17, 2004 | |
| INVENTOR(S) | : Kenneth L. Stanwood and Yair Bourlas | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2 days.

Signed and Sealed this
Twenty-sixth Day of April, 2011

David J. Kappos
*Director of the United States Patent and Trademark Office*